US008650533B2

(12) United States Patent
Hoff

(10) Patent No.: US 8,650,533 B2
(45) Date of Patent: Feb. 11, 2014

(54) MANAGEMENT OF VARIANTS OF AN ENTERPRISE PROCESS

(75) Inventor: Roland Hoff, Walldorf (DE)

(73) Assignee: SAP AG, Walldorf (DE)

( * ) Notice: Subject to any disclaimer, the term of this patent is extended or adjusted under 35 U.S.C. 154(b) by 657 days.

(21) Appl. No.: 12/884,857

(22) Filed: Sep. 17, 2010

(65) Prior Publication Data

US 2012/0072882 A1 Mar. 22, 2012

(51) Int. Cl.
*G06F 9/44* (2006.01)
(52) U.S. Cl.
USPC .......................................................... 717/102
(58) Field of Classification Search
USPC .......................................................... 717/102
See application file for complete search history.

(56) References Cited

U.S. PATENT DOCUMENTS

| 6,662,199 | B1 | 12/2003 | Flight et al. | |
|---|---|---|---|---|
| 2006/0005162 | A1* | 1/2006 | Tseng et al. | 717/107 |
| 2006/0123414 | A1* | 6/2006 | Fors et al. | 717/177 |
| 2008/0021754 | A1* | 1/2008 | Horn et al. | 705/8 |
| 2008/0155431 | A1* | 6/2008 | Bombolowsky | 715/762 |
| 2012/0185587 | A1* | 7/2012 | O'Sullivan et al. | 709/224 |

OTHER PUBLICATIONS

"SAP Modeling Handbook—Modeling Standards", Process Hierarchy—SAP Community Network Wiki, retrieved on Jul. 21, 2010 from http://wiki.sdn.sap.com, 4 pages.
Gschwind, T., et al, "Applying Patterns during Business Process Modeling", BPM 2008, LNCS vol. 5240, 2008, pp. 4-19.
Reichert, M., et al, "Extending a Business Process Modeling Tool with Process Configuration Facilities: The Provop Demonstrator", In: CEUR proceedings of the BPM '09 Demonstration Track, Business Process Management Conference 2009 (BPM'09), Sep. 2009, Ulm, Germany, 5 pages.
Non-Final Office Action for U.S. Appl. No. 12/884,881, mailed Oct. 2, 2012, 15 pages.
Final Office Action for U.S. Appl. No. 12/884,881, mailed Apr. 24, 2013, 15 pages.
Non-Final Office Action Response for U.S. Appl. No. 12/884,881, filed Dec. 28, 2012, 13 pages.
Advisory Office Action for U.S. Appl. No. 12/884,881, mailed Jul. 24, 2013, 3 pages.
Final Office Action Response for U.S. Appl. No. 12/884,881, filed Jul. 1, 2013, 12 pages.

* cited by examiner

*Primary Examiner* — Li B Zhen
*Assistant Examiner* — Sen Chen
(74) *Attorney, Agent, or Firm* — Brake Hughes Bellermann LLP

(57) ABSTRACT

A method can include receiving an indicator that an enterprise process has been selected from a plurality of enterprise processes, and receiving an enterprise process value defining at least a portion of a mandatory process step associated with a mandatory portion of the enterprise process, and an enterprise process parameter value defining at least a portion of an optional process step related to the mandatory process step. The method can include receiving an indicator that a filter from a set of filters has been selected, and defining a representation of the mandatory process step and a representation of the optional process step in response to the filter being selected. The method can also include receiving an indicator that the optional process step has been selected for binding to the mandatory portion of the enterprise process in a variant of the enterprise process.

20 Claims, 10 Drawing Sheets

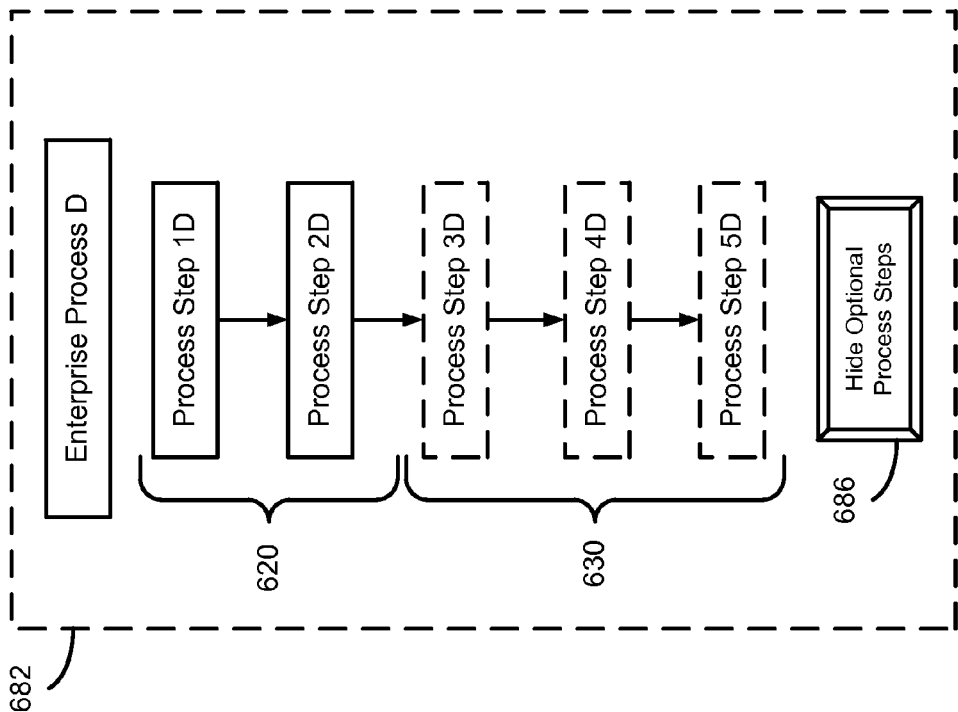
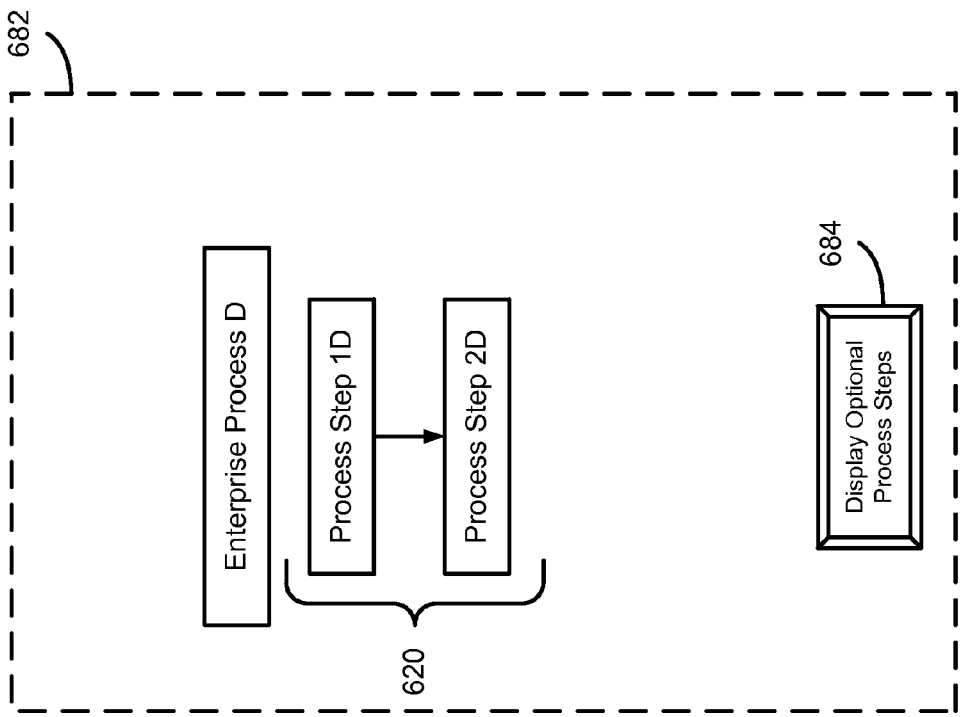
FIG. 6B
FIG. 6A

MANAGEMENT OF VARIANTS OF AN ENTERPRISE PROCESS

TECHNICAL FIELD

This description relates to customized enterprise processes implemented on a computer system.

BACKGROUND

Some known enterprise software packages include numerous preconfigured customized features that are intended to meet the needs of a variety of users. In some computer systems, installation of these known enterprise software packages may be undesirable because at least some of the preconfigured customized features may not be relevant to a particular user and/or could needlessly consume computing resources. In some instances, the preconfigured customized features that are available within the enterprise software package may not even meet the specific needs of a user of the computer system. In addition, the customized features of the enterprise software package may cause inconveniences during installation of the enterprise software package that may not be desirable to some users. Thus, a need exists for systems, methods, and apparatus to address the shortfalls of present technology and to provide other new and innovative features.

SUMMARY

According to one general aspect, a computer system can include instructions stored on a non-transitory computer-readable storage medium. The computer system can include an enterprise process manager configured to receive an indicator that an enterprise process has been selected from a plurality of enterprise processes, and configured to receive an enterprise process value defining at least a portion of a mandatory process step associated with a mandatory portion of the enterprise process, and an enterprise process parameter value defining at least a portion of an optional process step related to the mandatory process step. The computer system can include a filter manager configured to receive an indicator that a filter from a set of filters has been selected, and configured to define a representation of the mandatory process step and a representation of the optional process step in response to the filter being selected. The computer system can also include a solution package generator configured to receive an indicator that the optional process step has been selected for binding to the mandatory portion of the enterprise process in a variant of the enterprise process, and configured to define, in response to the indicator of the optional process step selection, at least a portion of a solution package based on the variant of the enterprise process.

According to another general aspect, a non-transitory computer-readable storage medium can store code representing instructions that when executed are configured to cause a processor to perform a process. The code can include code to receive an indicator that an enterprise process has been selected from a plurality of enterprise processes, and code to receive an enterprise process value defining at least a portion of a mandatory process step associated with a mandatory portion of the enterprise process, and an enterprise process parameter value defining at least a portion of an optional process step related to the mandatory process step. The code can include code to receive an indicator that a filter from a set of filters has been selected, and code to define a representation of the mandatory process step and a representation of the optional process step in response to the filter being selected. The code can also include code to receive an indicator that the optional process step has been selected for binding to the mandatory portion of the enterprise process in a variant of the enterprise process, and code to define, in response to the indicator of the optional process step selection, at least a portion of a solution package based on the variant of the enterprise process.

According to yet another general aspect, a method can include executing instructions recorded on a non-transitory computer-readable storage media using at least one processor. The method can include receiving an indicator that an enterprise process has been selected from a plurality of enterprise processes, and receiving an enterprise process value defining at least a portion of a mandatory process step associated with a mandatory portion of the enterprise process, and an enterprise process parameter value defining at least a portion of an optional process step related to the mandatory process step. The method can include receiving an indicator that a filter from a set of filters has been selected, and defining a representation of the mandatory process step and a representation of the optional process step in response to the filter being selected. The method can also include receiving an indicator that the optional process step has been selected for binding to the mandatory portion of the enterprise process in a variant of the enterprise process, and defining, in response to the indicator of the optional process step selection, at least a portion of a solution package based on the variant of the enterprise process.

The details of one or more implementations are set forth in the accompanying drawings and the description below. Other features will be apparent from the description and drawings, and from the claims.

BRIEF DESCRIPTION OF THE DRAWINGS

FIG. 6A is a block diagram that shows a mandatory portion of an enterprise process.

FIG. 6B is a block diagram that illustrates the mandatory portions of the enterprise process shown in FIG. 6A and an optional portion of the enterprise process.

DETAILED DESCRIPTION

Figure 1:
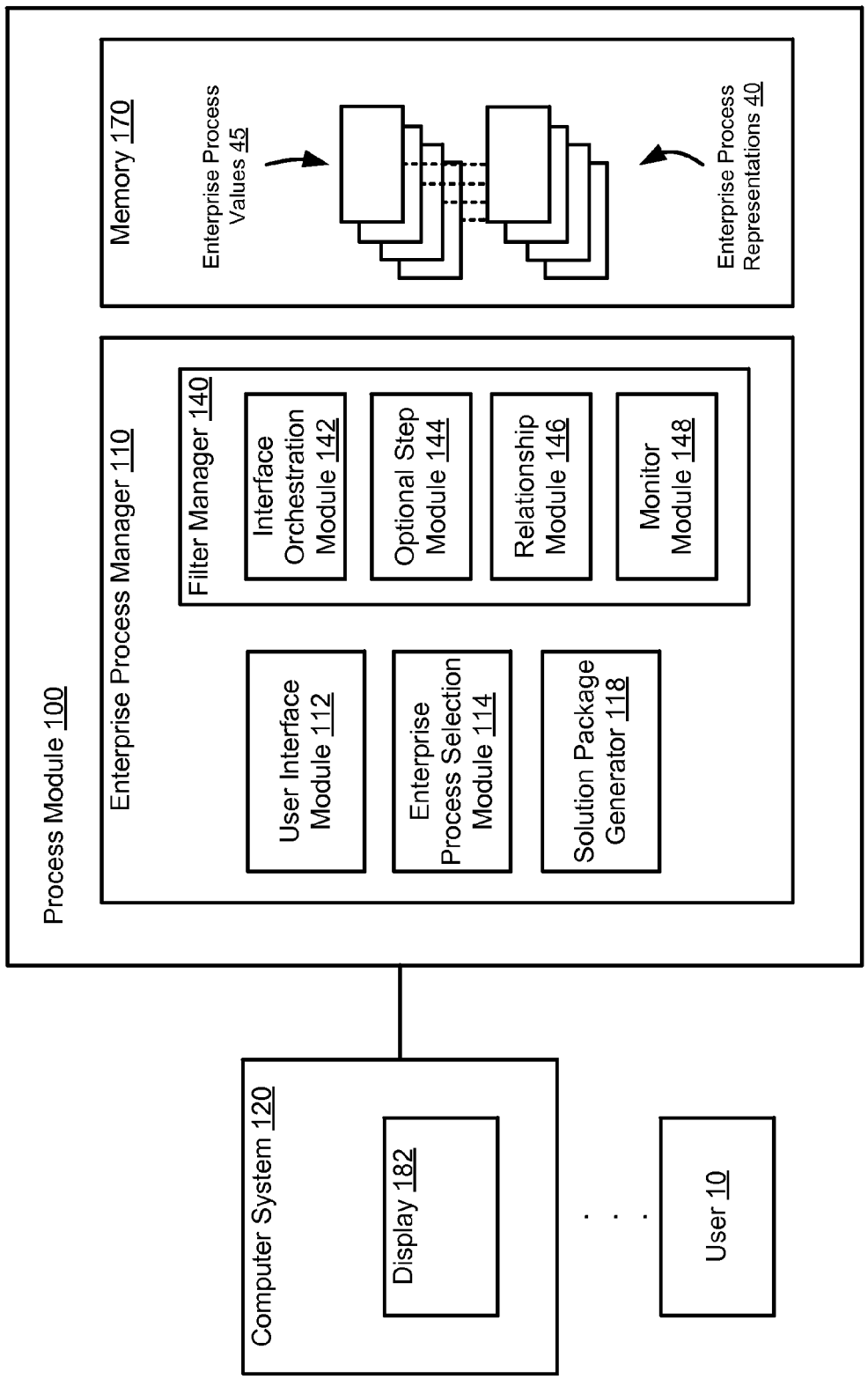
FIG. 1 is a block diagram that illustrates an enterprise process manager of a process module.

FIG. 1 is a block diagram that illustrates an enterprise process manager 110 of a process module 100. The process module 100 is configured to define a solution package associated with an enterprise process. Specifically, the process module 100 can be configured to facilitate a user to select optional portions (e.g., process steps, functions) of an enterprise process to define a customized version of the enterprise process that can be included in a solution package for implementation in a computer system 120 (also can be referred to as a target system). The customized version of the enterprise process can be referred to as a variant of the enterprise process. The process module 100 can also be configured to define the solution package based on the options selected by the user. The enterprise process can be, for example, an enterprise process for sales order processing, an enterprise process for invoice enterprise processing, an enterprise process for outbound delivery, and/or so forth.

As discussed herein, a solution package associated with an enterprise process can be any type of hardware and/or software combination that can be used to implement the enterprise process at the computer system 120. In other words, the solution package can be an implementation of (or can be used to implement) an enterprise process at the computer system 120. For example, the solution package can be an executable software module that can be installed on the computer system 120.

In some embodiments, the process module 100 can be configured to facilitate defining of a solution package that can be used to implement a customized version of an enterprise process (or a portion thereof) that can be implemented on (e.g., installed on, executed within), for example, computer system 120. The solution package can be defined by a solution package generator 118 of the enterprise process manager 110.

A variant of the enterprise process may include a combination of process steps and/or functions of the process steps selected for inclusion in an enterprise process. For example, a set of process steps (that are available for optional selection) can be selected for inclusion in an enterprise process. Certain functions (that are available for optional selection) can be associated with (e.g., define at least a portion of) a subset of the process steps from the set of process steps. The combination of the set of process steps and the functions associated with the subset of process steps can collectively define a variant of the enterprise process. Process steps that are selected for inclusion in an enterprise process can be referred to as being bound to the enterprise process and/or bound to process steps required as part of the enterprise process. Functions that are selected for inclusion in an enterprise process in conjunction with a process step can be referred to as being bound to the process step.

In some embodiments, an enterprise process can include mandatory process steps that define the core functionality of the enterprise process. An enterprise process that includes only mandatory process steps can be referred to as a standard version of the enterprise process. Optional process steps, when added to (e.g., appended to) the core functionality of the standard version of the enterprise process, can define a variant (or customized version) of the enterprise process. Also, optional functionality of the process steps of an enterprise process can define variants of the enterprise process. An example of an enterprise process with optional process steps that can be used to define variants of the enterprise process is shown in FIG. 2.

Figure 2:
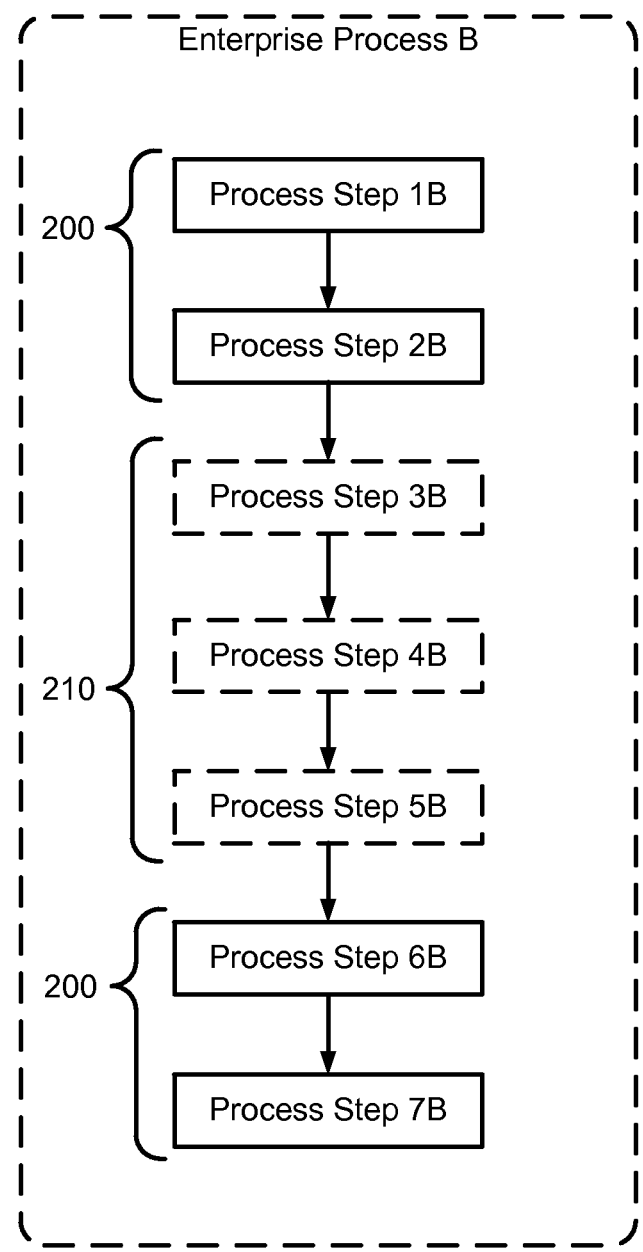
FIG. 2 is a block diagram that illustrates a representation of an enterprise process that includes mandatory process steps and optional process steps.

FIG. 2 is a block diagram that illustrates a representation of an enterprise process B that includes mandatory process steps 200 and optional process steps 210. In some embodiments, the representation of the enterprise process B can be referred to as enterprise process representation B. The mandatory process steps 200, which include process steps 1B, 2B, 6B, and 7B, define the core functionality of the enterprise process, and process steps 3B, 4B, and 5B are optional process steps 210. In some embodiments, a representation can be a representation (e.g., an electronic representation) defined by software and/or hardware. The representation (e.g., the representation of the enterprise process B) can be triggered for display based on, for example, a series of bit values associated with (e.g., defining) the representation.

A flow of information between the process steps of enterprise process B is represented by arrows. For example, optional process step 3B is related to mandatory process step 2B based on a function associated with the optional process step 3B being configured to process information (e.g., data) produced by a function of the mandatory process step 2B. Similarly, optional process step 5B is related to mandatory process step 6B based on a function associated with the optional process step 5B being configured to send information (e.g., data) to a function of the mandatory process step 6B.

Each of the process steps from the enterprise process B can be referred to by their classification as a mandatory process step 200 or as an optional process step 210 (which are types of process steps). For example, process step 3B, which is an optional process step 210 and can be referred to as optional process step 3B.

In this embodiment, the mandatory process steps 200 are represented by rectangles with solid lines. In other words, representations of the mandatory process steps 200 include rectangles with solid lines. Also, the optional process steps 210 are represented by rectangles with dashed lines. In other words, representations of the optional process steps 210 include rectangles with dashed lines.

Various combinations of the optional process steps 210 can be combined with (e.g., bound to) the mandatory process steps 200 to define variants of the enterprise process B. For example, process step 3B can be combined with the mandatory process steps 200 to define a first variant of the enterprise process B, and process steps 4B and 5B can be combined with the mandatory process steps 200 to define a second variant of the enterprise process. A variant of the enterprise process B that includes only the mandatory process steps 200 can be referred to as standard enterprise process B. Representations of these variants of the enterprise process B are not shown in FIG. 2.

In some embodiments, the optional process steps 210 can be dependent from the mandatory process steps 200, but not dependent from other optional process steps 210. For example, in some embodiments, a variant of the enterprise process B must include all of the mandatory process steps 200, but can include only a subset of the optional process steps 210. In other words, a variant of the enterprise process B can include all of the mandatory process steps 200 and only, for example, process step 5B. This variant of the enterprise process be can be operational without the preceding optional process steps—process step 3B and process step 4B.

The process steps shown in enterprise process B can represent process steps within an enterprise process. For example, the process steps of the enterprise process B can be representations of the process steps of a sales order processing enterprise process. Accordingly, mandatory process step 1B can represent a main process step related to creation, updating, rejecting a sales order, etc., and mandatory process step 2B can represent a process step related to an availability to purchase, promise, check, and/or update. Optional process step 3B can represent an optional credit check process step, optional process step 4B can represent an optional advertising campaign determination step, and optional process step 5B can represent an optional managerial accounting/auditing process step. Mandatory process step 6B can represent a mandatory purchase order request process step, and mandatory process step 7B can represent a mandatory delivery creation process step.

Referring back to FIG. 1, the enterprise process manager 110 includes a user interface module 112 configured to define one or more user interfaces (not shown in FIG. 1) that can be presented to a user 10. The user interfaces can be presented to the user 10 via a display 182 of the computer system 120. The user interface module 112 can be configured to manage (e.g., send, manipulate, trigger execution of) user interfaces through which users such as user 10 can access (e.g., use) the functionality of the process module 100.

In some embodiments, one or more of the user interfaces can be, for example, a browser-based user interface that includes various buttons, links, controls, services, and/or so forth that can be used by a user (such as user 10) to access the functionality of the process module 100. The user interface(s) can be rendered within the display 182 for the user 10 so that the user 10 can access one or more functions of the process module 100. For example, the user 10 can, using the computer system 120, access a user interface served by the user interface module 112 to a browser application of the computer system 120. The user 10 can then use the user interface to trigger one or more functions associated with the computer system 120.

The enterprise process manager 110 also includes an enterprise process selection module 114. The enterprise process manager 110 is configured to receive an indicator that an enterprise process has been selected for implementation (through a solution package) on the computer system 120. In some embodiments, an enterprise process can be selected for implementation on the computer system 110 based on enterprise process representations 40 stored in a memory 170 of the process module 100. Each of the enterprise process representations 40 can be a representation of an enterprise process that can be implemented on the computer system 120 using a solution package. Specifically, each of the enterprise process representations 40 can be similar to the representation of the enterprise process B shown in FIG. 2.

For example, one or more of the enterprise process representations 40 can be presented to a user of the computer system 120 via the display 182 of the computer system 120. The enterprise process representations 40 can be presented as options of enterprise processes that can be installed on the computer system 120 via a user interface triggered for display in the display 182 by the user interface module 112.

In some embodiments, the enterprise process that is selected for implementation on the computer system 120 from the enterprise process representations 40 can be associated with a particular computer product. For example, the enterprise process can be configured have a specified function and/or platform compatible with the computer system 120. In some embodiments, the computer system 120 can have a specified function and/or platform, and the enterprise process can be selected so that the implementation of the enterprise process will be compatible with the specified function and/or platform of the computer system 120. In some embodiments, the enterprise process selected for implementation on the computer system 120 can be related to a particular platform version. For example, the enterprise process that is selected can be related to an upgraded version of a platform, or an existing version of a platform.

The functionality associated with the enterprise processes (and/or process steps thereof) represented by the enterprise process representations 40 can be defined based on one or more enterprise process values 45. In some embodiments, the enterprise process values 45 can represent optional functionality that can be associated with one or more process steps of one or more enterprise processes. In other words, the enterprise process values 45 can define, or represent, for example, various functions of one or more of the enterprise processes and the various functions can be represented by the enterprise process representations 40. As shown in FIG. 1, the relationships between each of the enterprise process values 45 and each of the enterprise process representations 40 are represented by the dashed lines. In some embodiments, the enterprise process representations 40 can be defined, at least in part, by the enterprise process manager 110 based on the enterprise process values 45. In some embodiments, enterprise process values can collective define an enterprise process definition of an enterprise process.

In some embodiments, a single set of enterprise process values can be represented in multiple enterprise process representations. In some embodiments, a single enterprise process representation can be a representation of multiple sets of enterprise process values. An example of an enterprise process database that includes enterprise process values is shown in FIG. 3A, and an enterprise process representation of at least some of the functions defined by the enterprise process values shown in FIG. 3A is shown in FIG. 3B.

Figure 3A:
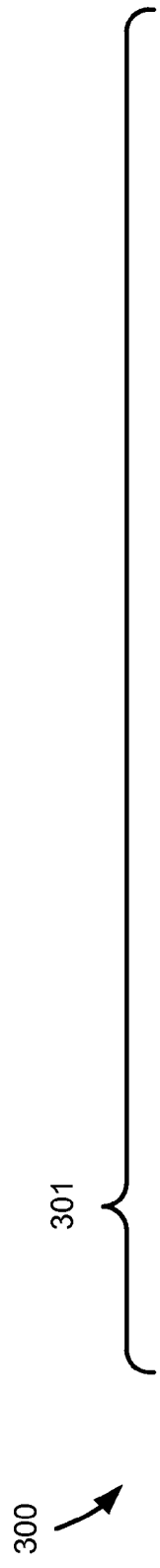
FIG. 3A is a diagram that illustrates an enterprise process database including enterprise process values associated with process steps of an enterprise process.
Figure 3B:
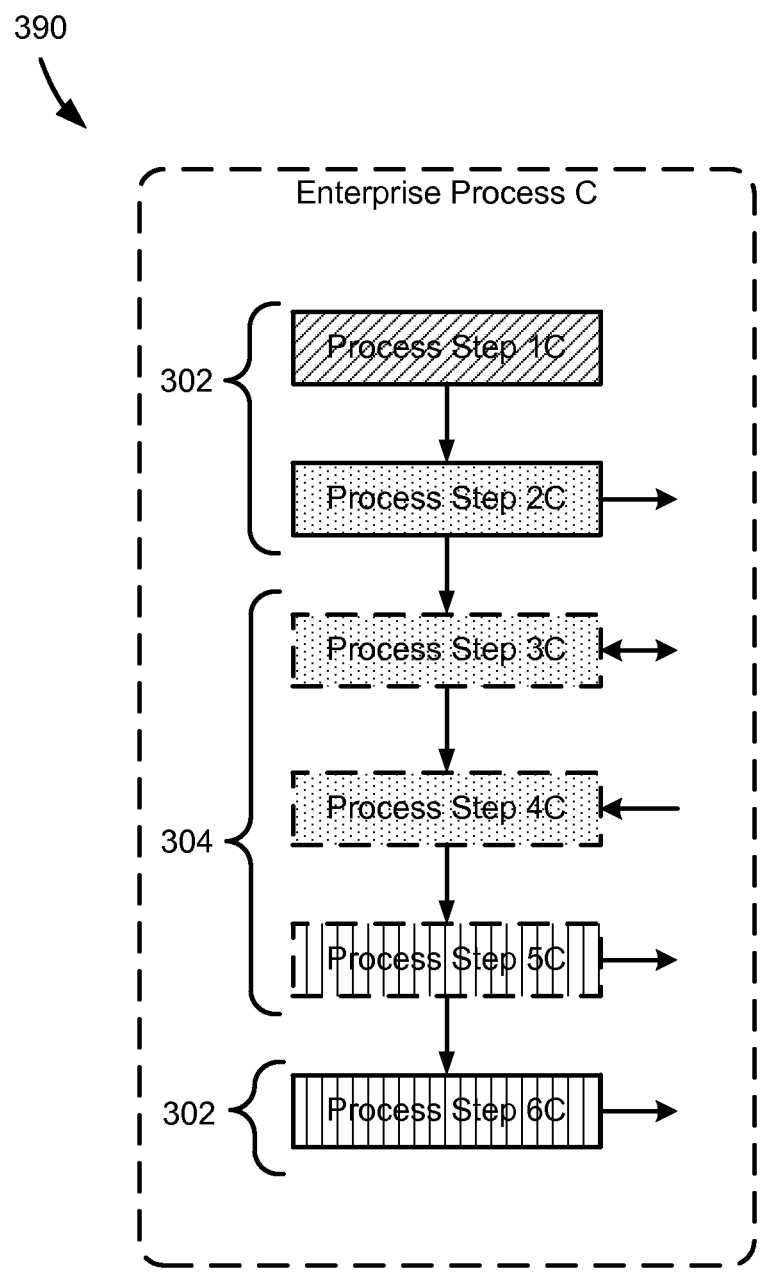
FIG. 3B is a diagram that illustrates a representation of at least some of the enterprise process values of the enterprise process database shown in FIG. 3A.

FIG. 3A is a diagram that illustrates an enterprise process database 300 including enterprise process values 301 associated with process steps of an enterprise process C. As shown in FIG. 3A, each of process steps of the enterprise process C are represented by process step identifiers 310, which include process steps 1C through 6C. The enterprise process database 300 also includes importance values 315, optional values 320, trigger values 325, interface values 330, monitor values 335, visibility values 340, and relationship values 345. These enterprise process values are described by way of example only and are not inclusive of every type of enterprise process value that can be associated with an enterprise process (and/or process steps thereof) such as enterprise process C.

In some embodiments, the process steps 1C through 6C can represent process steps of the enterprise process C. For example, process step 1C can represent a main process step related to creation, updating, rejecting a sales order, etc., and process step 2C can represent a process step related to an availability to purchase, promise, check, and/or update. Process step 3C can represent an optional credit check process step, and process step 4C can represent an optional managerial accounting/auditing process step. Process step 5C can represent a mandatory purchase order request process step, and process step 6C can represent a mandatory delivery creation process step.

The importance values 315 each represents an importance of each of the process steps respect to another process step. For example, a process step related to an importance value of "High" has a higher priority than a process step related to an importance value of "Medium", and a process step related to an importance value of "Medium" has a higher priority than a process step related to an importance value of "Low".

The importance values 315 can be used to determine whether or not a particular process step should be included in a representation of the enterprise process C. For example, a process step that is designated with an importance value of "High" may be included in all types of representations of enterprise process C, but a process step that is designated with an importance value of "Low" may only be included in a few specified representations of enterprise process C.

The optional values 320 each represent whether a process step within the enterprise process C is mandatory or optional. For example, process step 2C is identified within the enterprise process database 300 is being a mandatory process step (as shown in the optional values 320 column), and process step 3C is identified within the enterprise process database 300 as being an optional process step (as shown in the optional values 320 column). In some embodiments, a mandatory process step can be a process step that is required for the enterprise process to operate. For example, execution of process step 1C, which is identified within the enterprise process database 300 as being a mandatory process step, may be required for execution in order for any of the other process steps of the enterprise process C (or a portion thereof) to be subsequently executed. As a specific example, process step 1C may be a sales order process step that produces a cost value that is used by one or more functions of the subsequent process steps in the enterprise process C to calculate, for example, a total cost value.

Although not shown in FIG. 3A, in some embodiments, one or more process steps can be identified as being alternative process steps. For example, a process step can identified as being alternative to another process step within an enterprise process. In some embodiments, a process step in a first enterprise process can be identified as an alternative for another process step in a second enterprise process.

The trigger values 325 each represent data flow associated with the process steps within the enterprise process C. For example, a trigger value of "Outgoing" associated with, for example, process step 2C can indicate that process step 2C is configured to trigger another process (e.g., another process step associated with another enterprise process), or send data in an outgoing direction to another process (e.g., another process step associated with another enterprise process). Specifically, one or more functions of the process step 2C are configured to trigger another process or send data in an outgoing direction to another process.

A trigger value of "Incoming" associated with, for example, process step 4C can indicate that process step 4C is configured to be triggered by another process (e.g., another process step associated with another enterprise process), or receive data in an incoming direction from another process (e.g., another process step associated with another enterprise process). Specifically, one or more functions of the process step 4C is configured to be triggered by another process or receive data in an incoming direction from another process.

A trigger value of "Bidirectional" associated with, for example, process step 3C can indicate that process step 3C is configured to function as an "Incoming" process step and an "Outgoing" process step. Specifically, one or more functions of the process step 3C is configured to be triggered by and/or trigger another process, and configured to send data in an outgoing direction to another process and/or receive data in an incoming direction from another process.

In some embodiments, the trigger values of "Outgoing", "Incoming", and "Bidirectional" associated with a process step can be related to triggering of processes and/or data exchange with other process steps within the same enterprise process. For example, a trigger value of "Outgoing" associated with, for example, process step 2C can indicate that process step 2C is configured to trigger another process step within enterprise process C, or send data in an outgoing direction to another process step within enterprise process C.

The interface values 330 each represent whether or not a particular process step within the enterprise process C is configured to interface with an external application or an internal application. The internal application can be, for example, a third-party application installed on the same computer system (or network) where the enterprise process C is implemented. The external application can be, for example, a third-party application installed on a computer system (or network) separate from a computer system where the enterprise process C is implemented.

An interface value of "External" can indicate that the process step can be interfaced with an external application, and an interface value of "Internal" can indicate that the process step can be interfaced with an internal application. An interface value of "None" can indicate that the process step cannot be interfaced with an internal application or an external application. For example, as shown in FIG. 3A, process step 3C is configured to interface with an internal application as indicated by the "Internal" interface value shown in the interface value 330 column.

In some embodiments, an interface with one or more of the process steps of the enterprise process C can be implemented using an application programming interface (API). In some embodiments, an external interface with an application, in contrast with an internal interface, may not be allowed for security reasons. In some embodiments, an external interface can be referred to as an external communication interface, and an internal interface can be referred to as an internal communication interface.

The monitor values 335 each represent whether or not a particular process step within the enterprise process C is configured to be monitored. For example, process step 2C is a process step that can be monitored during execution of the process step 2C as indicated by the monitor value "Y" shown in the monitor values 335 column. For example, the progress of the process step 2C and/or data defined during execution of the process step 2C can be monitored. In some embodiments, the monitoring can be implemented via, for example, an external interface with a monitoring application and/or an internal interface with a monitoring application. As shown in FIG. 3A, process step 1C is a process step that may not be monitored during execution of the process step 1C as indicated by the monitor value "N".

The visibility values 340 each represent whether or not a particular process step within the enterprise process C is configured to interact with a user of the enterprise process C. A visibility value of "None" represents that the associated process step does not have one or more functions configured to interact with a user. Specifically, a visibility value of "None" represents that the associated process step neither requires an input value from a user nor produces a result that may be visible to a user via, for example, a user interface. In some embodiments, a process step designated with no visibility may function as a background process that is not visible.

A visibility value of "Input" represents that the associated process step requires user input in order for the process step to be executed. For example, process step 1C can be a process step that requires an input value (from a user) that one or more functions of the process step 1C can process. In some embodiments, the input value may be received by one or more functions the process step 1C for processing via a user interface. As a specific example, if the process step 1C is a process step related to ordering of widgets, the input value may be a quantity of widgets to be ordered.

A visibility value of "Result" represents that the associated process step does not require a user input, and a result of processing by the process step may be visible to a user via, for example, a user interface. For example, process step 2C can be a process step that can produce a result that can be presented to a user via a user interface (e.g., a notification via the user interface). As a specific example, if the process step 2C is a process step related to a credit check, the result may be a credit score associated with a user of the enterprise process C.

The relationship values 345 each represent whether a particular process step within the enterprise process C is used within another enterprise process. For example, as shown in FIG. 3A, process step 1C is included in enterprise process Z (as shown in the relationship values 345 column) in addition to enterprise process C, and process step 4C is included in enterprise process Y (as shown in the relationship values 345 column) in addition to enterprise process C. The other process steps are not associated with other enterprise processes as indicated by the relationship values 345.

Although not shown in FIG. 3A, in some embodiments, additional values can be used to indicate whether or not one or more of the enterprise process values 301 represents an optional function. For example, a set of values (not shown) can be configured to indicate whether or not one or more of the trigger values 325 is a mandatory trigger value that must be implemented in conjunction with a process step of an enterprise process, or is an optional trigger value that may be optionally selected for implementation in the enterprise process. Optional functions (which can be represented by one or more of the enterprise process values 301) that are selected for implementation in conjunction with a process step of an enterprise process can define (or further define) a variant of the enterprise process.

In some embodiments, a set of values (not shown) can be configured to indicate whether certain functions associated with process steps of an enterprise process are mutually exclusive. For example, an exclusivity value can indicate that a specified optional function associated with a process step may not also be selected for implementation with another optional function of the process step.

FIG. 3B is a diagram that illustrates a representation 390 of at least some of the enterprise process values 301 of the enterprise process database 300 shown in FIG. 3A. In some embodiments, the representation 390 can be displayed within a user interface in response to an instruction from a user interface module such as user interface module 112 shown in FIG. 1

As shown in FIG. 3A, the representation 390 of the enterprise process C illustrates process steps 1C through 6C. In this embodiment, the mandatory process step 302, which are shown in the optional values 320 column of FIG. 3A, are represented as rectangles with dashed lines. The optional process steps 304, which are shown in the optional values 320 column of FIG. 3A, are represented as rectangles with solid lines.

The trigger values 325 shown in FIG. 3A are also illustrated within the representation 390 of the enterprise process C. Specifically, the process steps 2C, 5C, and 6C, which are classified as "Outgoing" in the trigger values 325 column shown in FIG. 3A, are illustrated in FIG. 3B with arrows pointing to the right (out of the process steps). The process step 4C, which is classified as "Incoming" in the trigger values 325 column shown in FIG. 3A, is illustrated in FIG. 3B with an arrow pointing to the left (into the process steps). The process step 3C that is classified as "Bidirectional" in the trigger values 325 column shown in FIG. 3A, is illustrated in FIG. 3B with a double-sided arrow.

Also, the visibility values 340 shown in FIG. 3A are illustrated within the representation 390 of the enterprise process C. Specifically, the process step 1C, which is classified as "Input" in the visibility values 340 column shown in FIG. 3A, is shaded with slashed lines in FIG. 3B. The process steps 2C, 3C, and 4C, which are classified as "Result" in the visibility values 340 column shown in FIG. 3A, are illustrated in FIG. 3B with dotted shading. The process steps 5C and 6C that are classified as "None" in the visibility values 340 column shown in FIG. 3A, are illustrated in FIG. 3B with a vertical line shading.

Only a portion of the enterprise process values 301 included in the enterprise process database 300 shown in FIG. 3A are represented within the representation 390 of enterprise process C shown in FIG. 3B. In some embodiments, more or less of the enterprise process values 301 (shown in FIG. 3A) that are represented in representation 390 could be shown in a different representation of the enterprise process C.

Referring back to FIG. 1, the enterprise process manager 110 includes a filter manager 140. The filter manager 140 is configured to define representations of an enterprise process (e.g., representations of process steps of the enterprise process and functions thereof) selected for implementation at the computer system 120 so that the user 10 can select a variant of the selected enterprise process that can be implemented in a solution package by the solution package generator 118. In other words, the filter manager 140 is configured to define one or more representations of functions of process steps (both optional and mandatory) of a selected enterprise process as tools that can be used by the user 10 to, for example, visualize and/or select options (in various combinations) that can be included in a solution package associated with the selected enterprise process.

In this embodiment, the filter manager 140 includes several filter modules that are each configured to filter the enterprise process values to define representations of at least a portion of an enterprise process that can be presented to the user 10 based on the enterprise process values (or combinations thereof) such as enterprise process values 45. Specifically, each of the filter modules included in the filter manager 140 can be configured to select a specified subset of the enterprise process values associated with an enterprise process and define a representation of the specified subset of the enterprise process values so that the functionality of the enterprise process defined by the subset of enterprise process values can be, for example, visually interpreted and/or selected by a user (such as user 10). The information included in the representations can be used by the user to define a variant of the enterprise process.

In this embodiment, the filter manager 140 includes an interface orchestration module 142 configured to define a representation based on interface values, an optional step module 144 configured to define a representation based on optional values, a relationship module 146 configured to define a representation based on relationship values, and a monitor module 148 configured to define a representation based on monitoring values. In some embodiments, the filtering functions performed by each of the filter modules included in the filter manager 140 can be referred to as a filter. Accordingly, the filtering functions that can be performed by the filter modules can be collectively referred to as a set of filters. More details related to representations that can be defined by the filter modules included in a filter module are described in connection with, for example, FIGS. 6 through 9.

In some embodiments, the filtering associated with the filter modules included in the filter manager 140 can be triggered through a filter user interface, which can be managed by the user interface module 112. For example, a filter user interface can include filter buttons that, when selected, can trigger the functionality of the filter modules included in the filter manager 140 shown in FIG. 1. Specifically, the filtering of the interface orchestration module 142 can be triggered in response to an interface orchestration filter button being selected. The filtering of the optional step module 144 can be triggered in response to an optional step button being selected. The filtering of the relationship module 146 can be triggered in response to a relationship filter button being selected. The filtering of the monitor module 148 can be triggered in response to a monitor filter button being selected.

The solution package generator 118 is configured to define a solution package based on one or more variants of an enterprise process selected by the user 10. For example, the solution package generator 118 can be configured to receive an indicator that one or more optional process steps have been selected for inclusion in an enterprise process along with mandatory steps already included in the enterprise process. In other words, the optional process step(s) can be selected for binding to the mandatory steps already included in the enterprise process. In response to the indicator that the optional process steps have been selected, at least a portion of a solution package can be defined based on the variant of the enterprise process including the optional process steps.

In some embodiments, the solution package generator 118 can be configured to define one or more solution packages for multiple variants of a single enterprise process. In some embodiments, the solution package generator 118 can be configured to define one or more solution packages including multiple enterprise processes that could have one or more variants.

In some embodiments, a solution package can be, or can include, one or more databases, any type of executable software module such as a computer program based on, but not limited to, micro-code or micro-instructions, machine instructions, such as produced by a compiler, code used to produce a web service, and files containing higher-level instructions that are executed by a computer using an interpreter. For example, or more portions of a solution package may be implemented using Java, C++, or other programming languages (e.g., object-oriented programming languages) and development tools. In some embodiments, a solution package implementing one or more variants of one or more enterprise processes can define at least a portion of one or more applications or can be associated with one or more applications of the computer system 120. In some embodiments, a solution package can be, or can include, a user interface component associated with one or more variants of one or more enterprise processes implemented by the solution package, and the user interface component can be configured for display (e.g., rendering). In some embodiments, one or more solution packages can have, or can be, a background process with functionality that is not visible (i.e., not displayed).

In some embodiments, the solution package can include customized configuration data associated with a configuration file defining the variant of the enterprise process. Customized configuration data can be included in a database repository and can be configured to define one or more functions of the process steps of one or more variants of one or more enterprise processes.

As shown in FIG. 1, the functionality of the process module 100 can be accessed (e.g., can be triggered) via the computer system 120 on which a variant of an enterprise process is to be implemented. Specifically, the functionality of the process module 100 is accessed via the computer system 120 and the display 182 of the computer system 120. In some embodiments, the functionality of the process module 100 can be accessed (e.g., can be triggered) by the user via a terminal device associated with the computer system 120.

Although the functionality of the process module 100 was discussed in the context of variants of an enterprise process, the process module 100 can also be used to define a solution package associated with the standard enterprise process. For example, one or more of the filter modules included in the filter manager 140 can be used to define representations of variants of an enterprise process. A user, such as user 10, may decline to bind (if presented with the option) one or more optional steps to a mandatory portion of an enterprise process. In other words, a user may select a standard version of an enterprise process. Accordingly, a solution package can be defined by the solution package generator 118 based on only the mandatory portion of the enterprise process so that the solution package is configured to implement a standard version of the enterprise process.

In some embodiments, the process module 100 can also be configured to define a solution package that replaces an existing (e.g., an already installed) enterprise process implemented on the computer system 120. The enterprise process that replaces the existing enterprise process can be referred to as a replacement enterprise process. For example, an enterprise process implemented on the computer system 120 can be associated with an outdated program version. The process module 100 can be configured to define a solution package that implements the same enterprise process (which can be selected using the enterprise process selection module 114) associated with an upgraded program version. The solution package can be configured to replace the enterprise process associated with the outdated program version with the enterprise process associated with the upgraded program version so that the enterprise process associated with the upgraded program version can be used on the computer system 120. In some embodiments, the existing enterprise process can be a variant of the existing enterprise process and the replacement enterprise process can be a variant of the replacement enterprise process. In other words, a first variant of an enterprise process already implemented on the computer system 120 can be replaced by a second variant of the same enterprise process. In some embodiments, the enterprise process associated with the outdated program version can be replaced by a different enterprise process associated with the upgraded program version.

In some embodiments, the process module 100 can also be configured to define a solution package that modifies an existing (e.g., an already installed) enterprise process implemented on the computer system 120 without replacing the existing enterprise process. For example, the process module 100 can be configured to define a solution package that adds, or removes, a portion of an existing enterprise process implemented on the computer system 120. The portion of the existing enterprise process that is added or removed can be, for example, a process step (e.g., an optional process step) and/or a function associated with the process step.

Although not shown, in some embodiments the process module 100 (or portions thereof) can be configured to operate within, for example, a data center (e.g., a cloud computing environment), a computer system, one or more server/host devices, and/or so forth. In some embodiments, the functionality of the process module 100 can be distributed to several devices.

In some embodiments, one or more portions of the components shown in the process module 100 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the enterprise process manager 110 can be, or can include, a software module configured for execution by at least one processor (not shown). In some embodiments, the functionality of the components can be included in different modules and/or components than those shown in FIG. 1. For example, although not shown, the functionality of the enterprise process manager 110 can be included in a different module than the enterprise process manager 110, or divided into several different modules.

Although not shown, in some embodiments, the memory 170 can be implemented as more than one memory component (e.g., more than one random-access memory (RAM) component or disk drive memory) within the process module 100. In some embodiments, the memory 170 can be a database memory. In some embodiments, the memory 170 can be, or can include, a non-local memory (e.g., a memory not physically included within the process module 100). For example, the memory 170 can be, or can include, a memory shared by multiple devices (not shown). In some embodiments, the memory 170 can be associated with a server device (not shown) within a network and configured to serve the process module 100.

In some embodiments, the process module 100 (or portions thereof) and/or the computer system 120 (or portions thereof) can be configured to operate within a network. In other words, the process module 100 (or portions thereof) and/or the computer system 120 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The computer system 120 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), a host device, and/or so forth. The computer system 120 can be configured to operate based on one or more platforms (e.g., one or more similar or different platforms) that can include one or more types of hardware, software, firmware, operating systems, runtime libraries, and/or so forth. In some embodiments, computer system 120 can represent a cluster of devices (e.g., a server farm).

Figure 4:
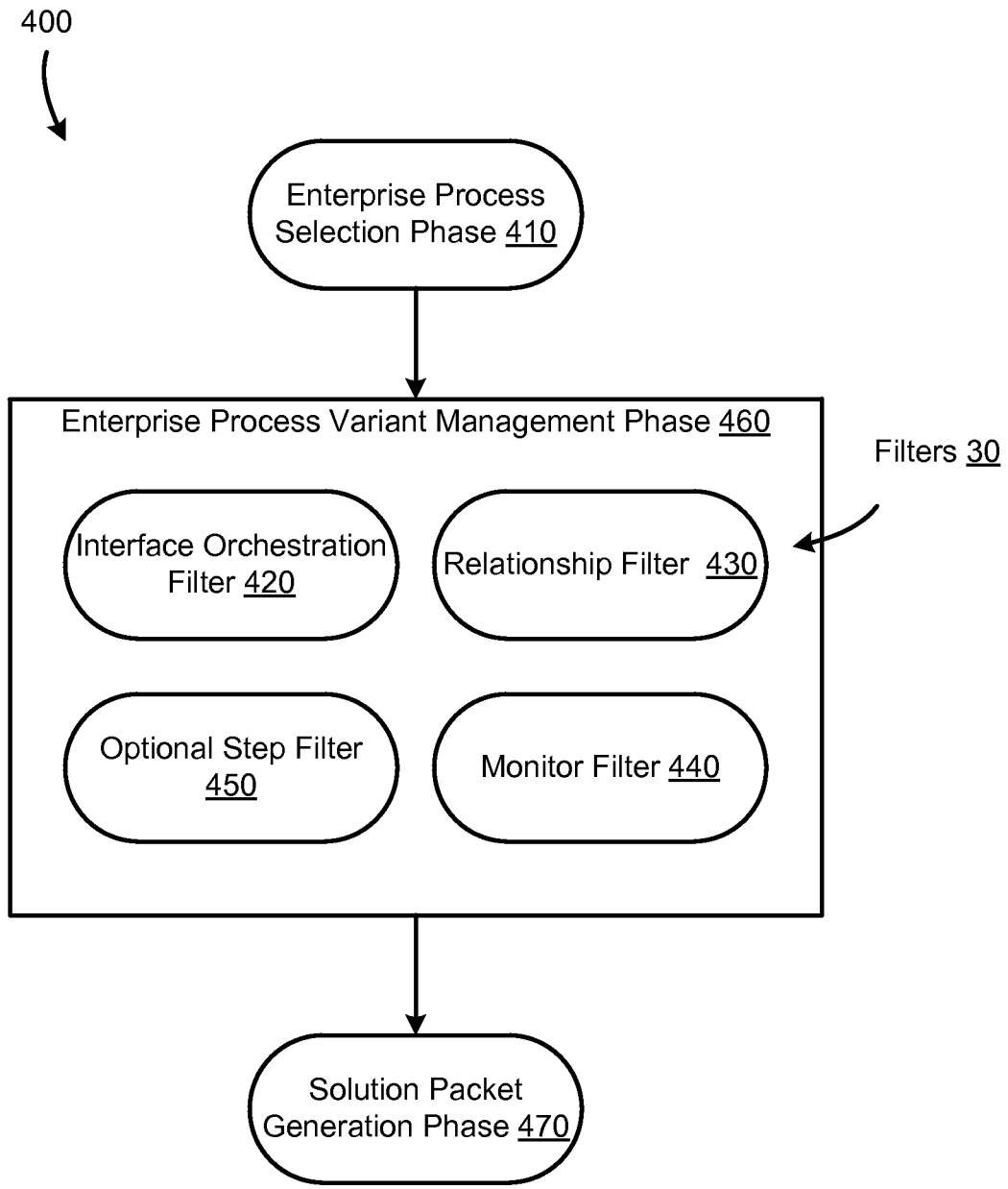
FIG. 4 is a flowchart that illustrates a method for managing variants of an enterprise process using a process module.

FIG. 4 is a flowchart 400 that illustrates a method for managing variants of an enterprise process using a process module. The process module can be a process module such as process module 100 shown in FIG. 1. As shown in FIG. 4, a flowchart 400 includes three main phases—an enterprise process selection phase 410, an enterprise process variant management phase 460, and a solution package generation phase 470.

During the enterprise process selection phase 410, an enterprise process to be implemented at a computer system can be selected from one or more available enterprise processes. The enterprise process can be selected based on, for example, a platform of the computer system, a desired functionality of the computer system, possible variants of the enterprise process, and/or so forth.

After the enterprise process has been selected, one or more filters 30 can be triggered during the enterprise process variant management phase 460. During this phase, variants of the enterprise process and functions of the process steps associated with variants of the enterprise process can be represented. The functions of the process steps can be represented using one or more enterprise process of values associated with the functions. In this embodiment, the filters 30 include an interface orchestration filter 420, a relationship filter 430, a monitor filter 440, and an optional step filter 450.

After a variant of the enterprise process has been selected based on filtering during the enterprise process variant management phase 460, a solution package can be generated during the solution package generation phase 470. In some embodiments, the solution package can be a program configured to implement the variant of the enterprise process selected during the enterprise process variant management phase 460.

Figure 5:
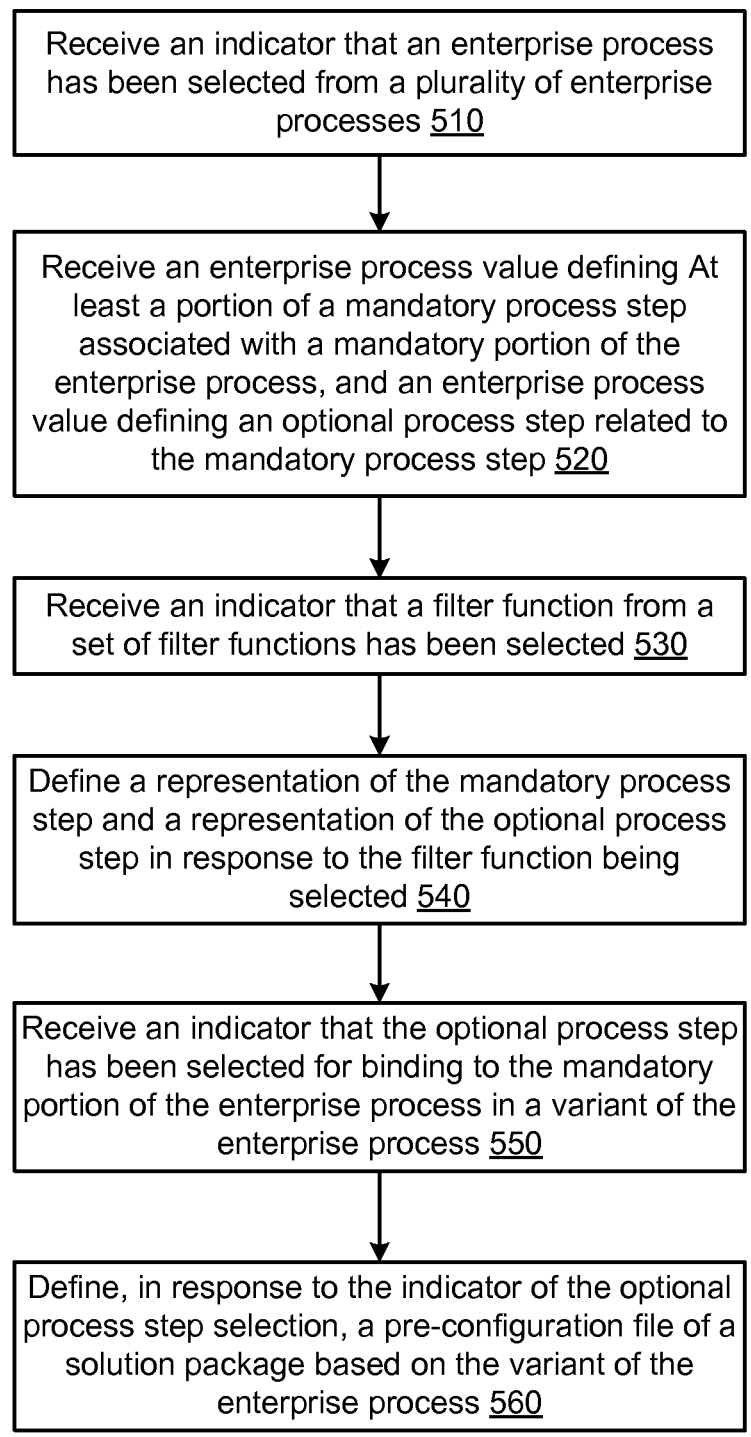
FIG. 5 is a flowchart that illustrates a method for defining a solution package based on a variant of an enterprise process.

FIG. 5 is a flowchart that illustrates a method for defining a solution package based on a variant of an enterprise process. The solution package can be targeted for implementation on (e.g., installation on), for example, a computer system. One or more portions of the flowchart shown in FIG. 5 can be performed by one or more portions of a process module such as process module 100 shown in FIG. 1.

As shown in FIG. 5, an indicator that an enterprise process has been selected from a plurality of enterprise processes is received (block 510). The enterprise process can be selected from a set of enterprise processes that are eligible for implementation on a computer system. In some embodiments, the enterprise process can be selected using an enterprise process selection module such as enterprise process selection module 114 shown in FIG. 1. In some embodiments, the enterprise process can be selected from the plurality of enterprise processes via a user interface. In some embodiments, the user interface can be managed by a user interface module such as user interface module 112 shown in FIG. 1.

An enterprise process value defining at least a portion of a mandatory process step associated with the mandatory portion of an enterprise process and an enterprise process value defining at least a portion of an optional process step related to the mandatory process step are received (block 520). In some embodiments, the enterprise process value defining the portion of the mandatory process step of the enterprise process can define a function of the mandatory process step. Similarly, the enterprise process value defining the portion of the optional process step can define a function of the optional process step.

An indicator that a filter from a set of filters has been selected can be received (block 530). In some embodiments, the filter can be, for example, an interface orchestration filter, a monitor filter, an optional step filter, a relationship filter, and/or so forth. In some embodiments, the filter can be selected from a set of filters via a user interface. In some embodiments, the filtering associated with the filters can be performed by one or more filter modules such as the filter module shown in FIG. 1.

A representation of the mandatory process step and the representation of the optional process step can be defined in response to the filter being selected (block 540). In some embodiments, the representation of the mandatory process step and/or the representation of the optional process step can be defined in accordance with the filter that has been selected.

An indicator that the optional process step has been selected for binding to the mandatory portion of the enterprise process in a variant of the enterprise process is received (block 550). In some embodiments, the indicator of the optional process step being bound to the mandatory portion of the enterprise process can be triggered via a user interface.

In response to the indicator of the optional process steps selection, a configuration file of the solution package based on the variant of the enterprise process can be defined (block 560). In some embodiments, the solution package can be an implementation of the variant of the enterprise process that can be installed on a computer system. In some embodiments, the solution package can be defined by a solution package generator such as solution package generator 118 shown in FIG. 1.

FIG. 6A is a block diagram that shows a mandatory portion 620 of an enterprise process D. The mandatory portion 620 of the enterprise process D, which includes mandatory process steps 1D and 2D, is shown in a user interface 682 (which can be a portion of another user interface). The mandatory portion 620 of the enterprise process D can be displayed in the user interface 682 based on one or more optional values included in, for example, an enterprise process database. In some embodiments, this representation of the mandatory portion 620 of the enterprise process D can be defined by an optional step module such as optional filtering step module 144 shown in FIG. 1 based on one or more optional values. In response to the "Display Optional Process Steps" button 684 being selected (e.g., selected by a user), optional process steps associated with the enterprise process D can be shown in the user interface 682.

FIG. 6B is a block diagram that illustrates the mandatory portions of the enterprise process D shown in FIG. 6A and an optional portion 630 of the enterprise process D. In this embodiment, the optional portion 630 includes optional process steps 3D, 4D, and 5D, which are represented by rectangles having dashed lines. The optional portion 630 of the enterprise process D can be displayed in the user interface 682 based on one or more optional values included in, for example, an enterprise process database. In some embodiments, this representation of the mandatory portion 620 of the enterprise process D can be defined by an optional step module such as optional filtering step module 144 shown in FIG. 1 based on one or more optional values. In response to the "Hide Optional Process Steps" button 686 being selected (e.g., selected by a user), optional process steps associated with the enterprise process D can be hidden and only the mandatory portion 620 of the enterprise process D may be shown in the user interface 682 as shown in FIG. 6A.

In some embodiments, one or more of the process steps associated with the enterprise process D can be associated with a particular program version. In some embodiments, multiple program versions of optional process steps and/or mandatory process steps of enterprise processes can be represented. In some embodiments, additional information associated with mandatory process steps 620 and/or the optional process steps 630 can be shown. For example, a portion of an enterprise process database (such as enterprise process database 300 shown in FIG. 3A) can be illustrated in conjunction with the enterprise process D.

Although not shown in FIG. 6A or FIG. 6B, in some embodiments, the representation of the enterprise process D shown in FIGS. 6A and 6B can be associated with one or more user interface components (e.g., radio buttons, check boxes) that can be used to specify whether or not the optional process steps are to be included in a solution package. An optional process step that is selected for inclusion in a solution package can be referred to as being bound to the enterprise process or a mandatory portion of the enterprise process. For example, a user interface component, when selected, can be configured to specify that process step 4D is to be included in enterprise process D as a variant of enterprise process D implemented in a solution package.

Figure 7:
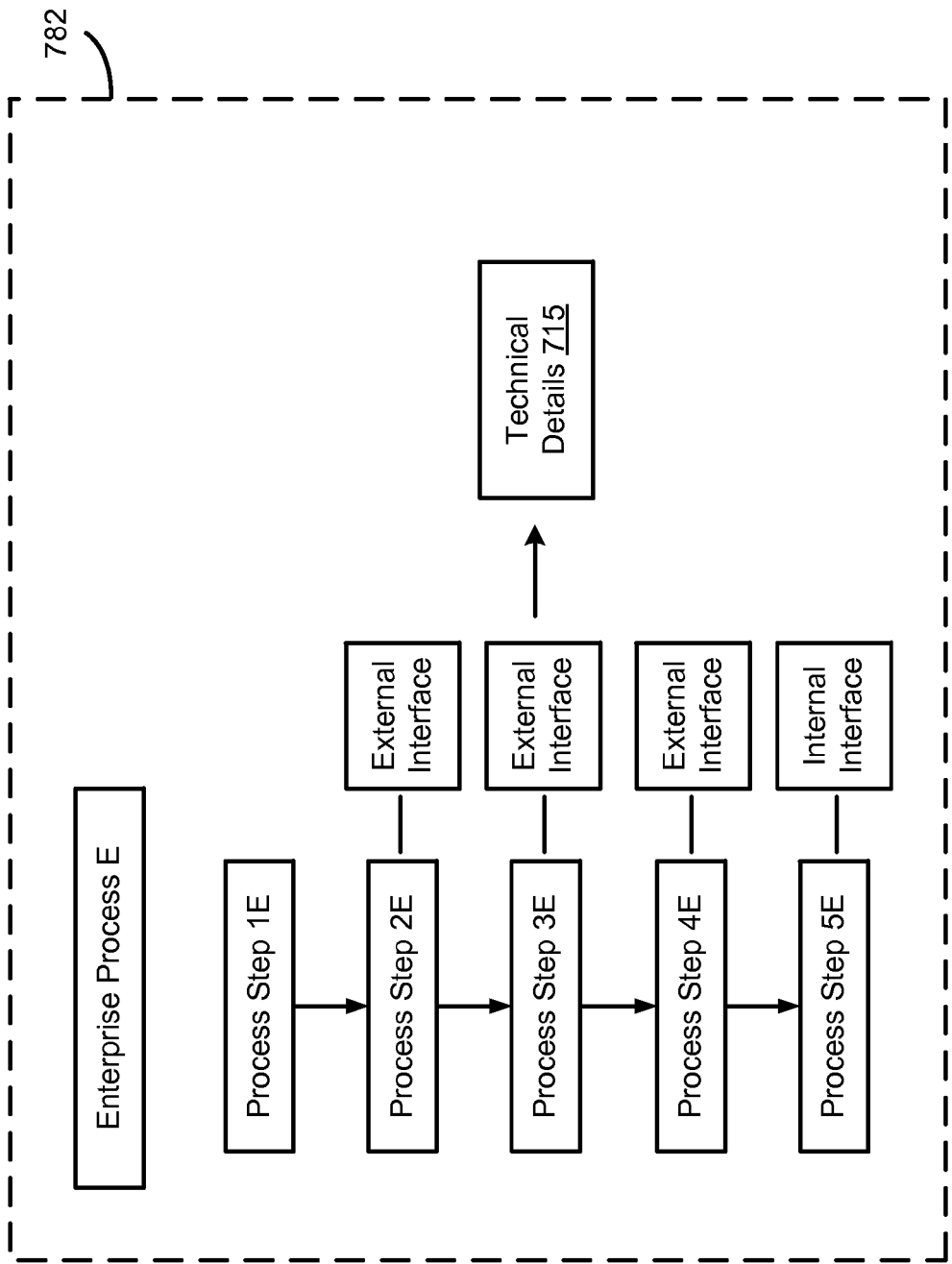
FIG. 7 is a block diagram that illustrates interface capabilities associated with process steps of an enterprise process.

FIG. 7 is a block diagram that illustrates interface capabilities associated with process steps of an enterprise process. Specifically, as shown in FIG. 7, process steps 2E through 4E are process steps of enterprise process E that are each eligible for interfacing with an external interface. For example, process steps 2E through 4E are configured so that one or more external applications can send and/or receive data from one or more functions associated with each of the process steps 2E through 4E. Process step 5E is a process step of enterprise process E that is eligible for interfacing with an internal interface. For example, the process step 5E is configured so that one or more internal applications can send and/or receive data from one or more functions associated with process step 5E.

In some embodiments, the representation of the interfacing capabilities associated with the process steps of the enterprise process E can be defined by, for example, an interface orchestration module such as interface orchestration module 142 shown in FIG. 1 based on one or more interface values such the interface values 330 shown in FIG. 3. As shown in FIG. 7, the representation of the interfacing capabilities of the process steps of the enterprise process E is included in a user interface 782 (which can be a portion of another user interface).

In some embodiments, technical details associated with one or more of the interfaces can be represented in conjunction with an enterprise process. As shown in FIG. 7, technical details 715 associated with an external interface of process step 3E are represented in conjunction with process step 3E of the enterprise process E. Although not shown in FIG. 7, the technical details 715 can include, for example, the types of applications that can interface with the functions of the process step 3E, the technical requirements for interfacing an application with the functions of the process step 3E, details of an application programming interface (APIs) associated with the interface, and/or so forth.

Although not shown in FIG. 7, in some embodiments, the representation of the enterprise process E shown in FIG. 7 can be associated with one or more user interface components that can be used to specify aspects of interfaces associated with the process steps that can be included in a solution package. An interface that is selected for inclusion in a solution package in conjunction with a process step can be referred to as being bound to the process step. For example, a user interface component, when selected, can be configured to specify that process step 3E is to be configured to interface with a particular external application that complies with the technical details 715. Accordingly, a solution package can be configured to implement this variant of the enterprise process E that includes the specified interface function associated with process step 3E.

Figure 8:
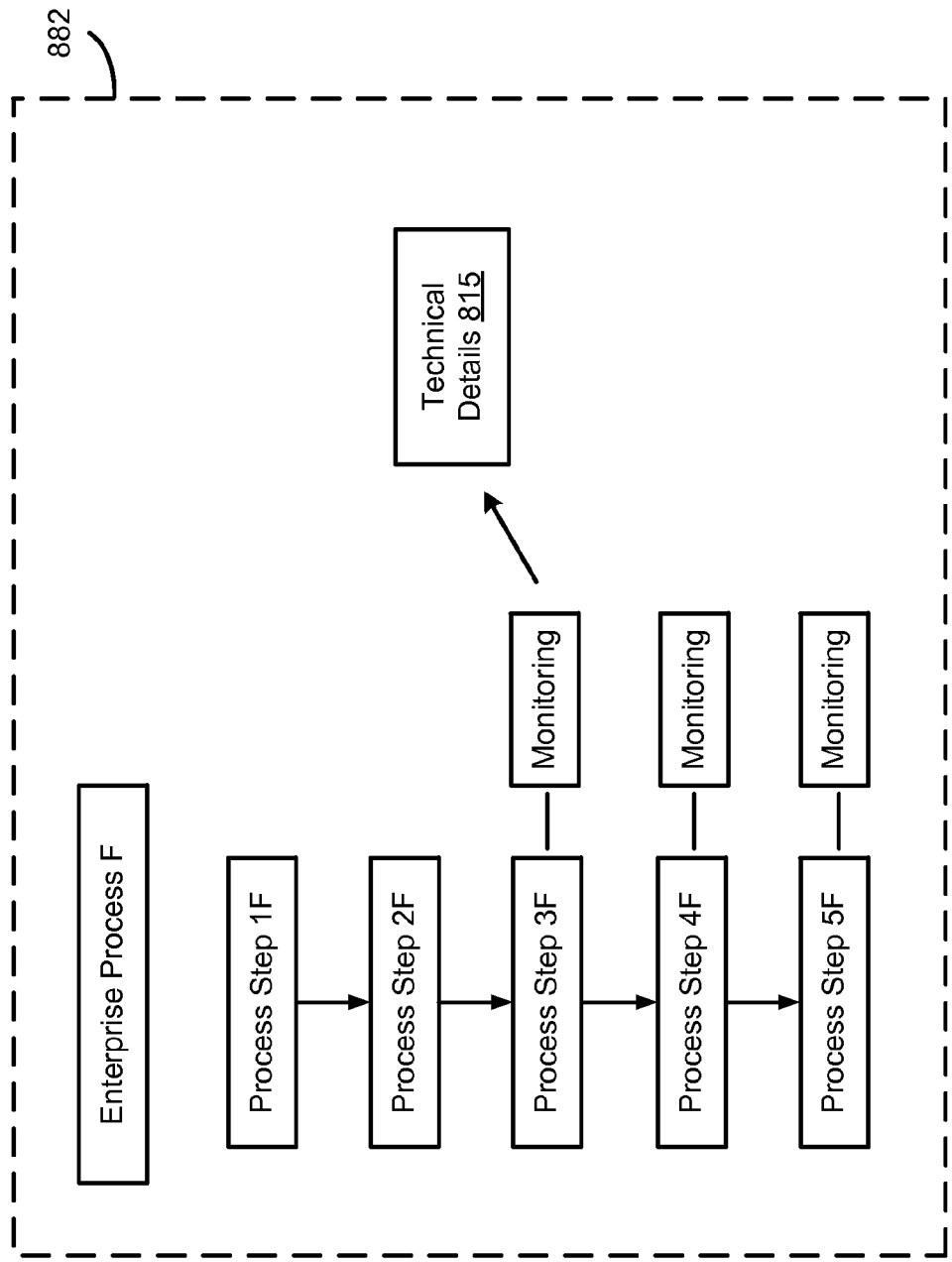
FIG. 8 is a block diagram that illustrates monitoring capabilities associated with process steps of an enterprise process.

FIG. 8 is a block diagram that illustrates monitoring capabilities associated with process steps of an enterprise process. Specifically, as shown in FIG. 8, process steps 3F through 5F are process steps of enterprise process F that are each eligible for monitoring. For example, process steps 3F through 5F are configured so that one or more applications (e.g., internal applications, external applications) can monitor the progress of one or more functions associated with (e.g., defining) each of the process steps 3F through 5F.

In some embodiments, the representation of the monitoring capabilities associated with the process steps of the enterprise process F can be defined by, for example, a monitor module such as monitor module 148 shown in FIG. 1 based on one or more monitor values such the monitor values 335 shown in FIG. 3. As shown in FIG. 8, the representation of the monitoring capabilities of the process steps of the enterprise process F is included in a user interface 882 (which can be a portion of another user interface).

In some embodiments, technical details associated with one or more of the monitoring functions can be represented in conjunction with an enterprise process. As shown in FIG. 8, technical details 815 associated with monitoring of process step 3F are represented in conjunction with process step 3F of the enterprise process F. Although not shown in FIG. 8, the technical details 815 can include, for example, the portions of the process step 3F that can be monitored, the technical requirements for monitoring the functions of the process step 3F, details of an application programming monitoring (APIs) associated with monitoring of the process step 3F, and/or so forth.

Although not shown in FIG. 8, in some embodiments, the representation of the enterprise process F shown in FIG. 8 can be associated with one or more user interface components that can be used to specify aspects of monitoring associated with the process steps that can be included in a solution package. Monitoring (or aspect thereof) that is selected for inclusion in a solution package in conjunction with a process step can be referred to as being bound to the process step. For example, a user interface component, when selected, can be configured to specify that process step 3F is to be monitored with a particular monitoring application that complies with the technical details 815. Accordingly, a solution package can be configured to implement this variant of the enterprise process F that includes the specified monitoring function associated with process step 3F.

Figure 9:
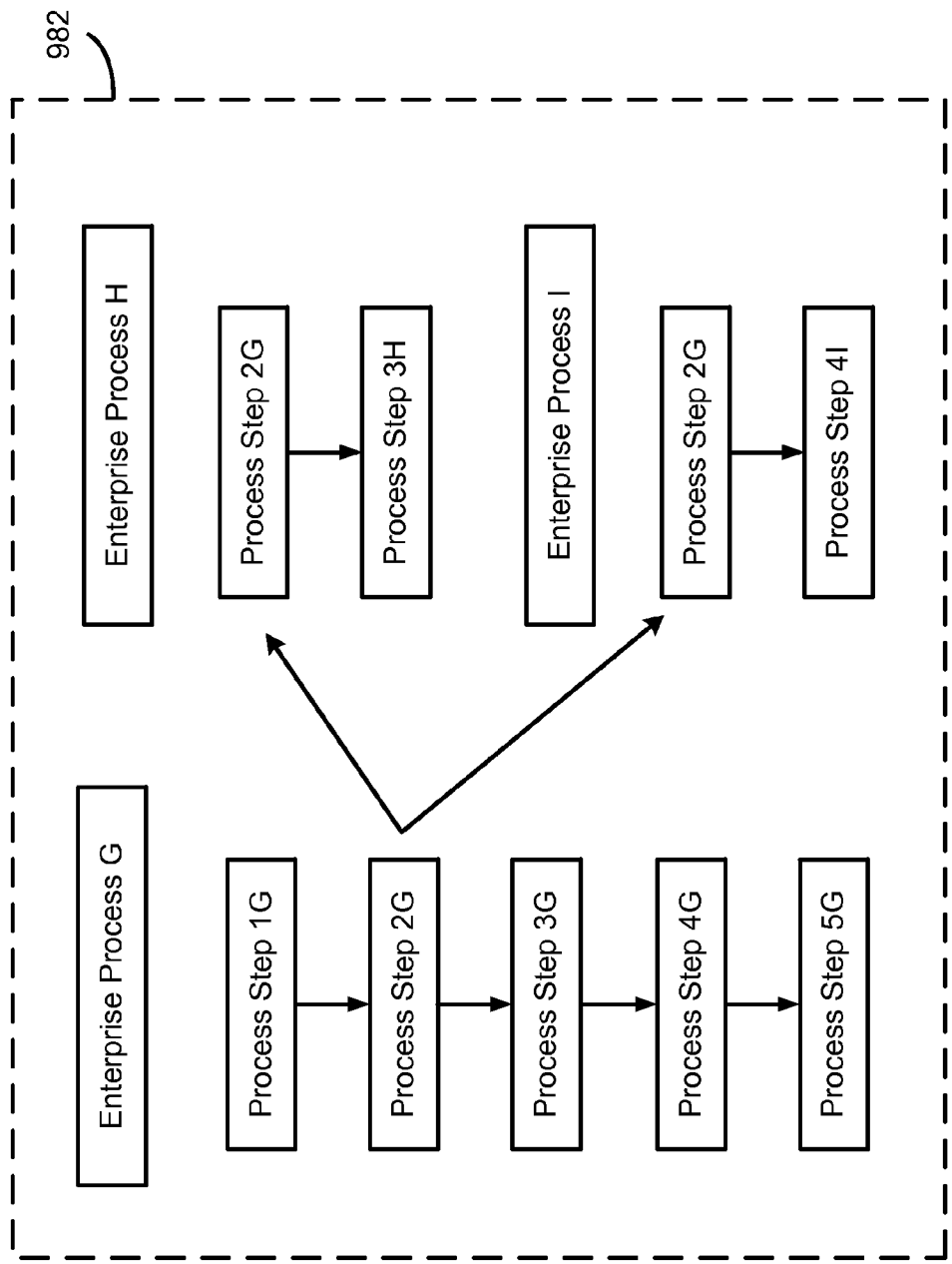
FIG. 9 is a block diagram that illustrates a relationship of a process step of an enterprise process with other enterprise processes.

FIG. 9 is a block diagram that illustrates a relationship of a process step of an enterprise process with other enterprise processes. As shown in FIG. 9, process step 2G of enterprise process G is included in enterprise process H and enterprise process I as represented by the arrows. In some embodiments, the representation of the relationship of process step 2G of the enterprise process G with enterprise process H and enterprise process can be defined by, for example, a relationship module (such as relationship module 146 shown in FIG. 1) based on one or more relationship values such the relationship values 345 shown in FIG. 3. As shown in FIG. 9, the representation of the relationships of the process steps of the enterprise process G with other enterprise processes is included in a user interface 982 (which can be a portion of another user interface).

In some embodiments, technical details associated with one or more of the relationships can also be represented. In some embodiments, a process step, when included in a first enterprise process, can be configured with specified functions that are different than the specified functions of the process step when included in a second enterprise process. The technical details associated with the differences of the functions of the process step when included in the first enterprise process compared with the second enterprise process can be represented. For example, the functions of the process step 2G, when included in enterprise process G, can be represented and contrasted with the functions of the process step 2G, when included in enterprise process H and/or enterprise process I.

Although not shown in FIG. 9, if the process step 2G is an optional process step, the representation of the enterprise process G shown in FIG. 8 can be associated with one or more user interface components that can be used to specify whether or not the optional process step is to be included in a solution package. For example, a user interface component, when selected, can be configured to specify that process step 2G, which can be optionally included in several enterprise processes, is to be included in enterprise process G as a variant of enterprise process G implemented in a solution package.

In some embodiments, one or more functions associated with one or more process steps of one or more enterprise processes can be combined (e.g., layered) in one or more representations. For example, multiple functions associated with various enterprise process values of a process step can be represented within a single representation. For example, the process steps of the enterprise process E shown in FIG. 7 can be shaded to illustrate one or more visibility values associated with the enterprise process E (such as the visibility values 340 shown in FIG. 3A) and/or can include arrows representing one or more trigger values associated with the enterprise process E (such as the trigger values 325 shown in FIG. 3A). The optionality of certain process steps can also be represented within FIG. 7. In some embodiments, if one or more of the process steps of the enterprise process E have functions that can be configured to interface with an application, the interfacing capability associated with the process step(s) of the enterprise process E can also be represented in FIG. 7. The representations within the other figures, like FIG. 7, can also include combinations of functions represented by one or more enterprise process values.

The representations illustrated throughout this detailed description are presented by way of example only. Various types of representations (and/or selection mechanisms) of enterprise processes (and/or the process steps thereof) can also be illustrated. For example, process steps of an enterprise process can be have different shapes that can represent one or more functions defined by one or more enterprise process values, user interface components can be used to trigger display of and/or hide one or more portions of an enterprise process, and/or so forth.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments.

What is claimed is:

1. A computer system including instructions stored on a non-transitory computer-readable storage medium, the computer system comprising:
    an enterprise process manager configured to receive an indicator that an enterprise process has been selected from a plurality of enterprise processes, and configured to receive an enterprise process value defining at least a portion of a mandatory process step associated with a mandatory portion of the enterprise process, and an enterprise process parameter value defining at least a portion of an optional process step related to the mandatory process step;
    a filter manager configured to receive an indicator that an interface orchestration filter has been selected and a monitor filter has been selected, and configured to define a representation of the mandatory process step and a representation of the optional process step in response to the filter being selected;
    an interface orchestration module configured to define, in response to the interface orchestration filter being selected, a representation of an external communication interface between an external application and at least one of the optional process step or the mandatory process step, and configured to receive an indicator that the external communication interface has been selected for binding to the at least one of the optional process step or the mandatory process step;
    a monitor module configured to define, in response to the monitor filter being selected, a representation of a monitor application configured to provide an indicator of progress of execution of at least one of the optional process step or the mandatory process step, and configured to receive an indicator that the monitor application has been selected for binding to the at least one of the optional process step or the mandatory process step; and
    a solution package generator configured to:
        receive an indicator that the optional process step has been selected for binding to the mandatory portion of the enterprise process in a variant of the enterprise process; and
        define, in response to the indicator of the optional process step selection, the indicator of the interface orchestration filter selection, and the indicator of the monitor filter selection, at least a portion of a solution package which is associated with the external communication interface and the monitor application based on the variant of the enterprise process.

2. The computer system of claim 1, wherein the representation of the optional process step includes a representation that a function of the optional process step is performed as a background process,
    the representation of the mandatory process step includes a representation that a result of a function of the mandatory process step is visible.

3. The computer system of claim 1, wherein the enterprise process is a first enterprise process, and the representation of the optional process step includes a representation that the optional process step is configured to trigger execution of at least one of an optional process step or a mandatory process step included in a second enterprise process.

4. The computer system of claim 1, wherein the filter includes an optional step filter, the optional process step is a first optional process step,
    the computer system further comprising:
    an optional step module configured to trigger, in response to the optional step filter being selected, display of a representation of a second optional process step,
    the solution package generator configured to receive an indicator that the second optional process step has been selected for inclusion in the variant of the enterprise process.

5. The computer system of claim 1, wherein the enterprise process is a first enterprise process, the filter manager is configured to receive a selection of a relationship filter,
    the computer system further comprising:
    a relationship module configured to trigger, in response to the relationship filter being selected, display of a representation of the optional process step in a second enterprise process having a mandatory portion different than the mandatory portion of the first enterprise process.

6. The computer system of claim 1, wherein the variant of the enterprise process is a first variant of the enterprise process, the optional process step is a first optional process step, the portion of the solution package is a first portion of the solution package, receive an indicator that a second optional process step has been selected for binding to the mandatory portion of the enterprise process in a second variant of the enterprise process; and define a second portion of the solution package based on the second variant of the enterprise process.

7. The computer system of claim 1, wherein the optional process step is related to the mandatory process step based on a function associated with the optional process step being configured to process data produced by a function of the mandatory process step.

8. The computer system of claim 1, wherein the portion of the solution package includes customized configuration data associated with a configuration file defining the variant of the enterprise process.

9. The computer system of claim 1, wherein the representation of the mandatory process step includes a function of the mandatory process step, and the representation of the function of the mandatory process step is defined by the enterprise process value associated with the mandatory process step.

10. The computer system of claim 1, wherein each enterprise process from the plurality of enterprise processes is associated with an upgraded program version, the enterprise process is selected from the plurality of enterprise processes based on the selected enterprise process corresponding with an enterprise process installed on a target system and associated with an outdated program version.

11. A non-transitory computer-readable storage medium storing code representing instructions that when executed are configured to cause a processor to perform a process, the code comprising code to:

receive an indicator that an enterprise process has been selected from a plurality of enterprise processes;

receive an enterprise process value defining at least a portion of a mandatory process step associated with a mandatory portion of the enterprise process, and an enterprise process parameter value defining at least a portion of an optional process step related to the mandatory process step;

receive an indicator that a filter from a set of filters has been selected;

define a representation of the mandatory process step and a representation of the optional process step in response to the filter being selected;

receive an indicator that the optional process step has been selected for binding to the mandatory portion of the enterprise process in a variant of the enterprise process;

define a representation of an external communication interface between an external application and at least one of the optional process step or the mandatory process step;

receive an indicator that the external communication interface has been selected for binding to the at least one of the optional process step or the mandatory process step;

define a representation of a monitor application configured to provide an indicator of progress of execution of at least one of the optional process step or the mandatory process step;

receive an indicator that the monitor application has been selected for binding to the at least one of the optional process step or the mandatory process step; and define, based on the indicator of the optional process step selection, the indicator of the external communication interface selection, and the indicator of the monitor application selection, at least a portion of a solution package based on the variant of the enterprise process.

12. The non-transitory computer-readable storage medium of claim 11, wherein the enterprise process is a first enterprise process, the representation of the optional process step includes a representation that the optional process step is configured to trigger execution of at least one of an optional process step or a mandatory process step included in a second enterprise process.

13. The non-transitory computer-readable storage medium of claim 11, wherein the representation of the optional process step includes a representation that a function of the optional process step is performed as a background process, the representation of the mandatory process step includes a representation that a result of a function of the mandatory process step is visible.

14. The non-transitory computer-readable storage medium of claim 11, wherein the optional process step is related to the mandatory process step based on a function associated with the optional process step being configured to process data produced by a function of the mandatory process step.

15. The non-transitory computer-readable storage medium of claim 11, wherein the portion of the solution package includes customized configuration data associated with a configuration file defining the variant of the enterprise process.

16. A method including executing instructions recorded on a non-transitory computer-readable storage media using at least one processor, the method comprising:

receiving an indicator that an enterprise process has been selected from a plurality of enterprise processes;

receiving an enterprise process value defining at least a portion of a mandatory process step associated with a mandatory portion of the enterprise process, and an enterprise process parameter value defining at least a portion of an optional process step related to the mandatory process step;

receiving an indicator that a filter from a set of filters has been selected;

defining a representation of the mandatory process step and a representation of the optional process step in response to the filter being selected;

receiving an indicator that the optional process step has been selected for binding to the mandatory portion of the enterprise process in a variant of the enterprise process;

defining a representation of an external communication interface between an external application and at least one of the optional process step or the mandatory process step;

receiving an indicator that the external communication interface has been selected for binding to the at least one of the optional process step or the mandatory process step;

defining a representation of a monitor application configured to provide an indicator of progress of execution of at least one of the optional process step or the mandatory process step;

receiving an indicator that the monitor application has been selected for binding to the at least one of the optional process step or the mandatory process step; and defining, based on the indicator of the optional process step selection, the indicator of the external communication interface selection, and the indicator of the monitor application selection, at least a portion of a solution package based on the variant of the enterprise process.

17. The method of claim 16, wherein the enterprise process is a first enterprise process, the representation of the optional process step includes a representation that the optional process step is configured to trigger execution of at least one of an optional process step or a mandatory process step included in a second enterprise process.

18. The method of claim 16, wherein the representation of the optional process step includes a representation that a function of the optional process step is performed as a background process, the representation of the mandatory process step includes a representation that a result of a function of the mandatory process step is visible.

19. The computer system of claim 1, wherein the mandatory process step produces a value that is used by one or more of the subsequent processes of the enterprise process.

20. The computer system of claim 1, wherein the filter manager is configured to generate a user interface component via which the indicator of the optional process step is received.

* * * * *